United States Patent
Bantle

(10) Patent No.: US 10,454,391 B2
(45) Date of Patent: Oct. 22, 2019

(54) HAND-HELD POWER TOOL

(71) Applicant: Robert Bosch GmbH, Stuttgart (DE)

(72) Inventor: Florian Bantle, Gruibingen (DE)

(73) Assignee: Robert Bosch GmbH, Stuttgart (DE)

( * ) Notice: Subject to any disclaimer, the term of this patent is extended or adjusted under 35 U.S.C. 154(b) by 481 days.

(21) Appl. No.: 14/713,304

(22) Filed: May 15, 2015

(65) Prior Publication Data
US 2015/0333664 A1    Nov. 19, 2015

(30) Foreign Application Priority Data

May 16, 2014   (DE) .................. 10 2014 209 354
Sep. 8, 2014    (DE) .................. 10 2014 217 863

(51) Int. Cl.
*H02P 1/22*    (2006.01)
*B25F 5/00*    (2006.01)
*B25F 5/02*    (2006.01)

(52) U.S. Cl.
CPC .............. *H02P 1/22* (2013.01); *B25F 5/00* (2013.01); *B25F 5/001* (2013.01); *B25F 5/02* (2013.01)

(58) Field of Classification Search
CPC .... B25F 5/001; B25F 5/00; B25F 5/02; H02P 1/16; H02P 1/22
USPC ........................ 173/2, 20, 213, 217
See application file for complete search history.

(56) References Cited

U.S. PATENT DOCUMENTS

| | | | | |
|---|---|---|---|---|
| 3,221,192 A | * | 11/1965 | Franklin | H01H 9/061 310/50 |
| 3,579,002 A | * | 5/1971 | Wickham | H01H 9/063 200/522 |
| 4,342,931 A | * | 8/1982 | Grossmann | H01H 9/063 173/48 |
| 4,592,144 A | * | 6/1986 | Tolbert | B23D 49/167 200/291 |
| 5,089,729 A | * | 2/1992 | Moores, Jr. | H01H 9/063 200/1 V |
| 5,261,140 A | * | 11/1993 | Szymanski | A47L 11/162 15/49.1 |
| 5,365,155 A | | 11/1994 | Zimmermann | |

(Continued)

FOREIGN PATENT DOCUMENTS

| | | |
|---|---|---|
| CN | 1287950 C | 12/2006 |
| CN | 201808050 U | 4/2011 |

(Continued)

*Primary Examiner* — Robert F Long
(74) *Attorney, Agent, or Firm* — Maginot, Moore & Beck LLP

(57) ABSTRACT

A hand-held power tool includes a housing with a handle, a transmission, a drive motor, a tool receiver, and a first switch unit. The transmission and drive motor are arranged in the housing, the transmission being configured to transmit a torque generated by the drive motor to the tool receiver, which is configured to rotate about a rotation axis. The first switch unit is configured to control the drive motor, and has a first switching element and a second switching element that are configured to operate the first switch unit and that enable an operator to influence various control variables of the drive motor. The second switching element is further configured to control a direction of the rotation of the drive motor, and upon actuation, execute a linear movement that is substantially parallel to the rotation axis.

19 Claims, 9 Drawing Sheets

(56) References Cited

U.S. PATENT DOCUMENTS

| | | | | |
|---|---|---|---|---|
| 5,561,734 | A * | 10/1996 | Simonsen | H01C 10/00 388/838 |
| 5,681,214 | A * | 10/1997 | Kleider | B23D 45/16 451/344 |
| 6,058,797 | A * | 5/2000 | Konig | G05G 1/06 16/436 |
| 6,086,502 | A * | 7/2000 | Chung | B25F 5/001 475/299 |
| 6,138,346 | A * | 10/2000 | Shutts | B25B 7/126 29/741 |
| 6,186,709 | B1 * | 2/2001 | Hsu | B25F 5/001 200/318.2 |
| 6,536,536 | B1 * | 3/2003 | Gass | B23B 31/123 173/171 |
| 6,641,340 | B1 * | 11/2003 | Hajjar | A61C 13/0003 269/283 |
| 6,742,601 | B2 * | 6/2004 | Numata | B24B 23/028 173/170 |
| 6,860,341 | B2 * | 3/2005 | Spielmann | B25F 5/001 173/216 |
| 7,021,400 | B2 * | 4/2006 | Oretti | B23B 31/123 173/176 |
| 7,028,784 | B2 * | 4/2006 | Breitenmoser | B25F 5/001 173/170 |
| 7,044,234 | B2 * | 5/2006 | Manschitz | B25D 16/006 173/170 |
| 7,401,663 | B2 * | 7/2008 | Craven | B25F 5/001 173/171 |
| 7,464,430 | B2 * | 12/2008 | Filsouf | A61C 17/3472 15/22.1 |
| 7,565,935 | B1 * | 7/2009 | Phillips | B23G 1/18 173/176 |
| 8,757,287 | B2 * | 6/2014 | Mak | A47J 43/0755 173/170 |
| 9,242,362 | B2 * | 1/2016 | Abante | B25F 5/001 |
| 2003/0196824 | A1 * | 10/2003 | Gass | B23B 31/123 173/131 |
| 2004/0140781 | A1 * | 7/2004 | Craven | B25F 5/001 318/280 |
| 2004/0141818 | A1 | 7/2004 | Kuhn | |
| 2005/0045354 | A1 * | 3/2005 | Arimura | B25B 21/00 173/219 |
| 2006/0255754 | A1 * | 11/2006 | Rudolf | B25F 5/00 318/66 |
| 2007/0139847 | A1 | 6/2007 | Liu | |
| 2007/0256914 | A1 * | 11/2007 | Lohr | B25B 21/00 200/5 A |
| 2009/0200053 | A1 * | 8/2009 | Scrimshaw | B23B 31/123 173/47 |
| 2010/0071923 | A1 * | 3/2010 | Rudolph | B25B 21/00 173/48 |
| 2010/0084151 | A1 * | 4/2010 | Kuhnle | B25D 16/006 173/47 |
| 2010/0163261 | A1 * | 7/2010 | Tomayko | B23B 45/008 173/47 |
| 2010/0193206 | A1 * | 8/2010 | Teng | B25B 21/02 173/48 |
| 2011/0147021 | A1 * | 6/2011 | Schaal | B25D 16/006 173/47 |
| 2012/0031636 | A1 * | 2/2012 | King | B25B 23/00 173/20 |
| 2012/0056566 | A1 * | 3/2012 | Lexer | H01H 9/063 318/280 |
| 2012/0106133 | A1 * | 5/2012 | Roehm | B25F 5/021 362/119 |
| 2014/0048298 | A1 * | 2/2014 | Fuchs | B25B 21/00 173/1 |
| 2015/0144368 | A1 * | 5/2015 | Machida | B25F 5/006 173/162.2 |

FOREIGN PATENT DOCUMENTS

| | | |
|---|---|---|
| CN | 103085018 A | 5/2013 |
| DE | 86 04 458 U1 | 6/1987 |
| DE | 20 2006 018 837 U1 | 4/2007 |
| DE | 10 2012 206 884 A1 | 10/2013 |
| DE | 10 2012 220 423 A1 | 5/2014 |
| EP | 1 510 299 A2 | 3/2005 |
| EP | 2 589 465 A2 | 5/2013 |
| JP | 2002-154073 A | 5/2002 |

* cited by examiner

HAND-HELD POWER TOOL

This application claims priority under 35 U.S.C. § 119 to patent application no. DE 10 2014 209 354.6, filed on May 16, 2014 in Germany, and to patent application no. DE 10 2014 217 863.0, filed on Sep. 8, 2014 in Germany, the disclosures of which are incorporated herein by reference in their entirety.

The present disclosure relates to a hand-held power tool, in particular a baton screwdriver, a drill/driver or a cordless drill/driver having a tool receiver that can be put into rotation and that can be driven by a drive motor, via a transmission.

BACKGROUND

Hand-held power tools such as, for example, baton screwdrivers, cordless drill/drivers or power drills are known from the prior art, and have a housing that has at least one switch, by means of which the transmission and/or the motor can be controlled.

DE 8604458 U1 discloses, for example, a hand-held tool having a housing, the housing having a handle that comprises a first switch, for controlling the motor, and a second switch, for controlling the transmission. A drive shaft extends forward out of the transmission housing. In the case of such hand-held power tools, the direction of rotation of the drive shaft can be set by means of the second switch. In this case, a switching element inside the housing is controlled by means of the second switch, which is arranged on the outside of the housing. The second switch is thus independent of the first switch. Alternatively, this second switch, which is responsible for the direction of rotation, may also be a part of the first switch, by means of which the rotational speed of the motor is controlled. It is found to be disadvantageous in this case that, with all variants, the direction of control of the second switch is effected largely transversely in relation to the rotation axis of the hand-held power tool, with the result that there is not an intuitive assignment of the switch position and the direction of rotation. Accordingly, it is sought to indicate the direction of rotation of the transmission by means of symbols on the housing of the hand-held power tool or directly on the second switch, this positioning proving to be disadvantageous since, depending on how the handle is gripped, it is not possible, or is possible only with difficulty, to read these symbols during operation.

SUMMARY

The object of the disclosure is to rectify the above-mentioned disadvantages and to provide a hand-held power tool that is easy to operate in respect setting the direction of rotation, while also being inexpensive and flexible, and having a low rate of wear and a long service life.

This object is achieved by a hand-held power tool according to the disclosure. Advantageous designs, variants and further developments of the disclosure are given by the drawings and the claims.

Such a hand-held power tool comprises a housing having a handle, a transmission, arranged in the housing, for transmitting a torque, which is generated by a drive motor, to a tool receiver that rotates about a rotation axis x, and a first switch unit, for controlling the drive motor, which is arranged in the housing and has a first switching element and a second switching element for operating the switch unit. Various control variables of the drive motor, such as, for example, the setting of rotational speed, torque or the like are influenced by the operator, by means of the first switching element and the second switching element. The direction of rotation of the drive motor is controllable by means of the second switching element, the second switching element, upon actuation, executing a linear movement that is substantially parallel to the rotation axis x. Achieved directly as a result is a clear and intuitive assignment of the switch position of the second switching element to the resultant working direction, or direction of rotation, of the tool receiver, even in the case of the hand-held power tool being held in an unfavorable manner, for example if the screwdriver is held upside down or sideways. The arrangement thus ensures easy operation in respect of setting the direction of rotation, a hand-held power tool according to the disclosure having a low rate of wear and long service life, because of the linear movement, and at the same time being easy and safe to manipulate.

Preferably, the second switching element engages in at least two positions, a first position corresponding to a first direction of rotation of the drive motor, the first direction of rotation of the drive motor being assigned to a first direction of rotation of the tool receiver.

It is particularly advantageous in this case if a second position corresponds to a second direction of rotation of the drive motor, the second direction of rotation of the drive motor being assigned to a second direction of rotation of the tool receiver.

Preferably, the first position is closer than the second position to the tool receiver, the first direction of rotation of the tool receiver effecting a clockwise rotation of the tool receiver. Accordingly, in a particularly preferred design, the second position is farther than the first position from the tool receiver, the second direction of rotation of the tool receiver effecting an anticlockwise rotation of the tool receiver.

The second switching element preferably engages in a third position, such that, in the third position, the operation of the first switch unit by means of the first switching element is blocked. In this case, in a particularly preferred design, the third position is located between the first position and the second position. Advantageously, the blocking of the first switching element and/or of the first switch unit in the third position of the second switching element may be effected electrically, electronically and/or mechanically.

Preferably, the second switching element actuates a direction of rotation switch, the direction of rotation switch, in an advantageous design, being integrated into the first switch unit.

In a preferred embodiment, the second switching element is mounted on the outside of the housing and connected to a switching web inside the housing, the switching web being in engagement with the direction of rotation switch and being movable substantially parallelwise in relation to the rotation axis x. The engagement in this case may be effected by means of a connecting element that is movable substantially parallelwise in relation to the rotation axis x.

Preferably, the engagement may be effected by means of a rotary disk, which is rotatable about a rotation axis y. Alternatively, the engagement may be effected by means of a switch rocker, which can be moved transversely in relation to the rotation axis x, such that the conversion of the longitudinal movement of the switching web into the transverse movement of the switch rocker is effected by means of a gate shift.

In an alternative embodiment, the second switching element may operate a second switch unit that electronically transmits the position of the second switching element to the first switch unit, the position of the second switching element being able to be sensed by a sensor, in particular a sensor that operates inductively, capacitively, magnetically and/or optically.

It is particularly advantageous, in principle, if the second switching element is arranged in front of the first switching element, along a common axis x' that is substantially parallel to the rotation axis x and that extends beneath the housing. The second switching element is thus arranged in front of the first switching element in the direction of the tool receiver, along the notional axis x', such that the second switching element can be actuated with the index finger or the middle finger, depending on the grip position, and it is possible for the hand-held power tool to be operated with one hand. It is particularly advantageous in this case if the second switching element is of a shape that follows a contour of the housing in such a manner that the second switching element can be operated on both sides.

In a preferred embodiment, the second switching element has a plurality of portions, the portions advantageously being arranged on the outside of the housing and connected to the switching web inside the housing, and each projecting in differing directions out of the housing. Advantageously, the second switching element extends, at least portionally, inside the housing.

In an alternative embodiment, the second switching element has at least two portions, the two portions being mounted on the outside of the housing, substantially parallel and opposite in relation to each other along the rotation axis x. This arrangement enables the second switching element to be actuated both with the index finger or middle finger of the holding hand, or with the user's other hand.

Preferably, the first switching element is a manually operated press switch, the second switching element being a manually operated slide switch.

Generally, a hand-held power tool is to be understood to mean, for example, baton screwdrivers, percussion power drills, multifunction tools, drill/drivers, cordless drills, cordless screwdriver and/or cordless drill/drivers. The hand-held power tool in this case has a transmission for transmitting a torque, generated by a drive motor, to a drive shaft, and various drilling tools, bit attachment or drilling heads, for example, can be used as tools.

Transmission of electrical energy in this context is to be understood to mean, in particular, that the hand-held power tool transfers energy to the drive motor via an electric power cable connection to the body and/or via a battery in the housing.

Further features, application possibilities and advantages of the disclosure are given by the following description of the exemplary embodiments of the disclosure that are represented in the figures. It is to be noted that the features represented are merely descriptive in character, and may also be applied in combination with features of other further developments described above, and are not intended to limit the disclosure in any form.

BRIEF DESCRIPTION OF THE DRAWINGS

Features of the disclosure are described in greater detail in the following on the basis of preferred exemplary embodiments. In the drawings.

DETAILED DESCRIPTION

Figure 1:
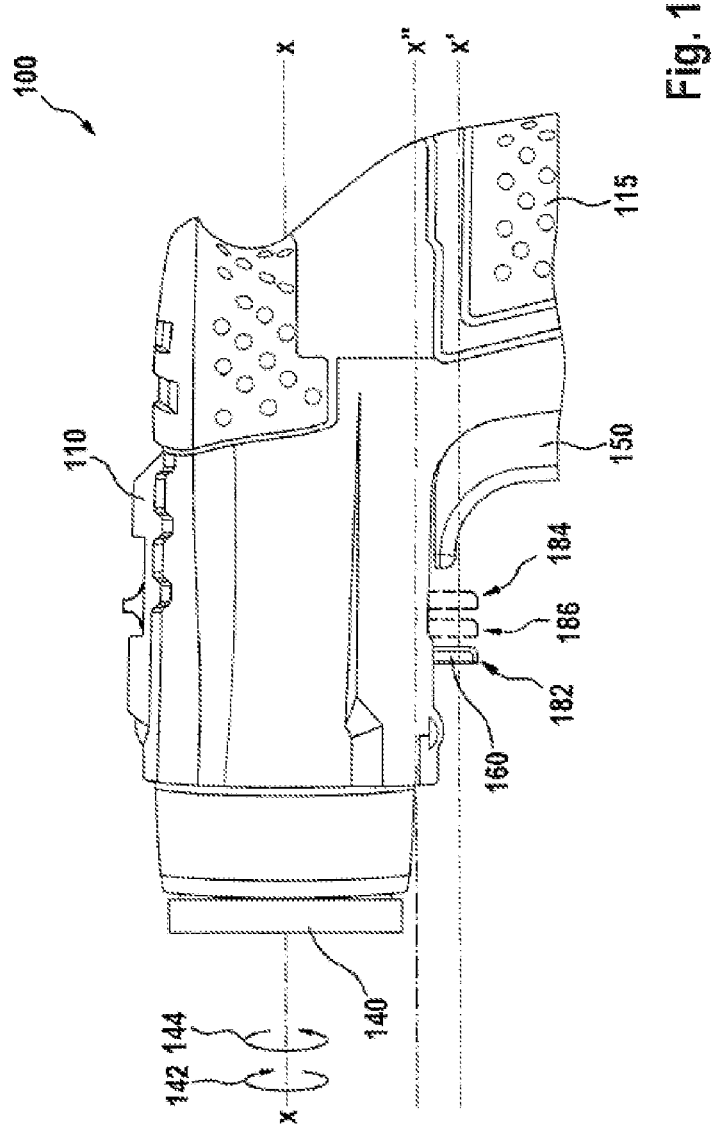
FIG. 1 shows a schematic side view of a hand-held power tool according to the disclosure, having a first embodiment of the second switching element.

FIG. 1 shows a schematic exploded view of an embodiment of a hand-held power tool 100 according to the disclosure, which has a housing 110 comprising a handle 115 that is arranged on the housing 110. According to the embodiment represented, the hand-held power tool 100 can be used both with a mains-dependent electric power supply and with an electric power supply that is non-dependent on mains power, the hand-held power tool 100, for the purpose of electric power supply that is non-dependent on mains power, being such that it can be mechanically and electrically connected to an energy storage device, which is, in particular, a type of battery for supplying voltage to the drive motor, and which is arranged in the housing 110, in particular in the region of the handle 115. Also arranged in the housing 110 are an electric drive motor, which is supplied with electric power, and a transmission 120. The drive motor is connected, via the transmission 120 and a drive shaft, to a tool receiver 140 for a tool, not represented, for example a drilling tool or a bit attachment.

The hand-held power tool 100 has a first switching element 150 for actuating a first switch unit 130 (see FIG. 2, 3) for supplying energy to the drive motor. The first switching element 150 can be actuated manually by the user, by a pressure motion, in order thus to switch the voltage supply to the drive motor on and/or off. Upon being moved, the first switching element 150 acts in a directly and/or indirectly actuating manner upon the first switch unit 130.

The first switch unit 130, which is only indicated schematically in the figures, is an electrical switch, realized in a conventional manner, having an electromechanical contact system. The first switching element 150 acts in a known manner, via a connecting means, not represented in detail, that extends movably into the interior of the housing 110, upon the first switch unit 130. Accordingly, the first switching element 150 may also be a sensor press switch, having a sensor, such as a force sensor, a Hall sensor, a magnetoresistive sensor, a capacitive pressure sensor, or the like.

A connecting means 167 that can be made to connect operatively both to the first switching element 150 and to the first switch unit 130 transmits the movement of the first switching element 150 to the first switch unit 130.

As can be seen from FIG. 1, the first switching element 150 projects out of the housing 110 of the handle 115 so as to be manually accessible to the user, such that, in a manner known per se, it is made possible to control the drive motor by open-loop and/or closed-loop control by means of the first switch unit 130, preferably in dependence on the displacement path of the first switching element 150. For example, the user, by corresponding manual displacement of the first switching element 150, can set the rotational speed, the torque or the like of the drive motor, in the manner of a "revving" function.

The hand-held power tool 100 additionally has a second switching element 160, in the form of slide switch, for setting the direction of rotation of the drive motor of the hand-held power tool 100. The second switching element 160 is arranged so as to be displaceable along a rotation axis x of the drive shaft, in particular of the tool receiver 140 of the hand-held power tool 100, such that the second switching element 160, upon actuation, executes a linear movement substantially parallelwise in relation to the rotation axis x and, in the embodiment represented, can be moved back and forth between a first position 182, a second position 186 and a third position 184. The first and the second position in this case each define a direction of rotation of the drive motor. Thus, the first position 182 is assigned to a first direction of rotation of the drive motor, and the second position 184 is assigned to a second direction of rotation of the drive motor, with, in turn, the first direction of rotation of the drive motor being assigned to a first direction of rotation 142 of the tool receiver 140, and a second direction of rotation 144 of the drive motor being assigned to a second direction of rotation of the tool receiver 140. The first position 182 is closer than the second position 184 to the tool receiver 140, the first direction of rotation 142 of the tool receiver 140 effecting a clockwise rotation and consequently causing, for example, a screw to be screwed-in. By contrast, the second position 184 is farther than the first position 182 from the tool receiver 140, and effects an anticlockwise rotation of the tool receiver 140, and consequently causing a screw to be screwed-out.

The user of the hand-held power tool can thus identify, merely from the positions 182, 184 of the second switching element 160, the working mode in which the hand-held power tool 100 is working.

Moreover, the second switching element 160 may have, for example, a switching contact for the voltage supply to the drive motor, in order to disconnect the drive motor from the voltage supply when the hand-held power tool 100 is not in use.

In addition, the second switching element 160 has a third position 186, being a middle position, between the first position 182 and the second position 184, the motor current being interrupted electrically, electromechanically and/or mechanically in the third position 186. Thus, for example, the operation of the first switch unit 130 by means of the first switching element 150 can be blocked mechanically, the second switching element 160, when moved into a third position 186, acting in a locking manner upon the first switching element 150. Alternatively, the blocking of the first switching element 150 and/or of the first switch unit 130, and therefore the interruption of the motor current, when the second switching element 160 is in the third position 186 may be effected electrically and/or electromechanically, for example by the emission of a signal to an electronic unit of the hand-held power tool, in particular to the first switch unit 130.

Figure 2:
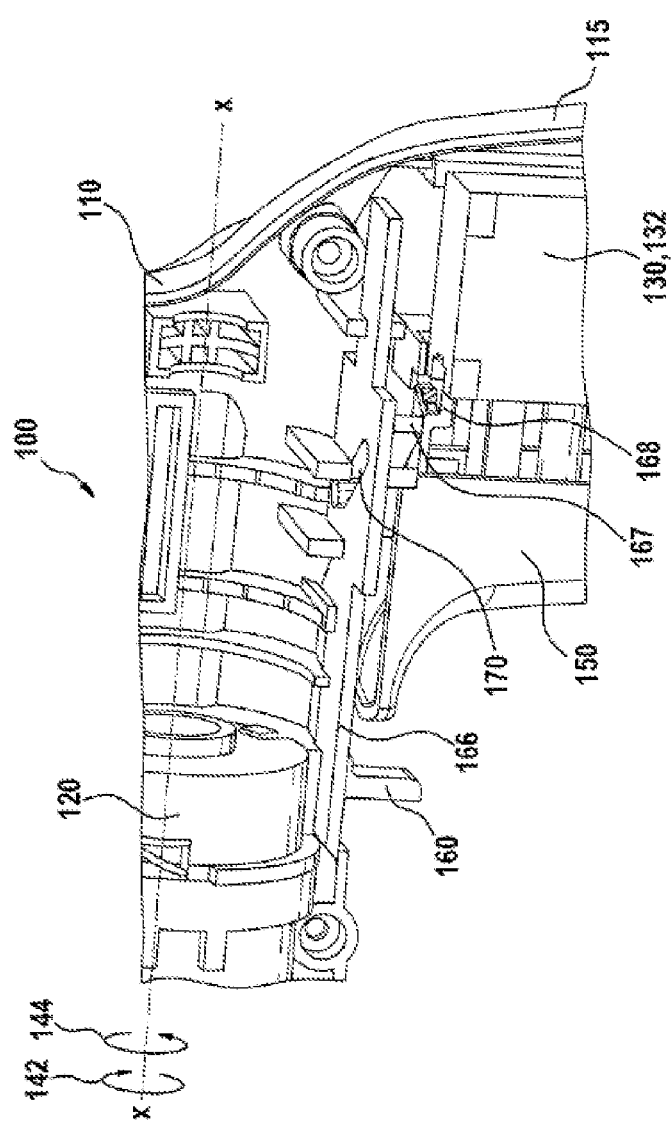
FIG. 2 shows a schematic, enlarged sectional side view of the embodiment from FIG. 1 of the second switching element having a gate shift.

As represented in FIGS. 2, 3 and 4, and 6 to 12, there are various possibilities for realizing a linear movement, according to the disclosure, of the second switching element 160. One variant is represented in FIG. 2, wherein the second switching element 160 actuates a direction of rotation switch 132. In the embodiment represented, the direction of rotation switch 132 is integrated directly into the first switch unit 130. The second switching element 160 is mounted on the outside of the housing 110, and connected to a switching web 166, which is inside the housing 110. The switching web 166 is in engagement with the direction of rotation switch 132, by means of a connecting element 166, and can be moved substantially parallelwise in relation to the rotation axis x. Moreover, this switch arrangement has a switch rocker 168, which can be moved transversely in relation to the rotation axis x. The conversion of the longitudinal movement of the switching web 166 into the transverse movement of the switch rocker 168 is effected by means of a gate shift 170.

Figure 3:
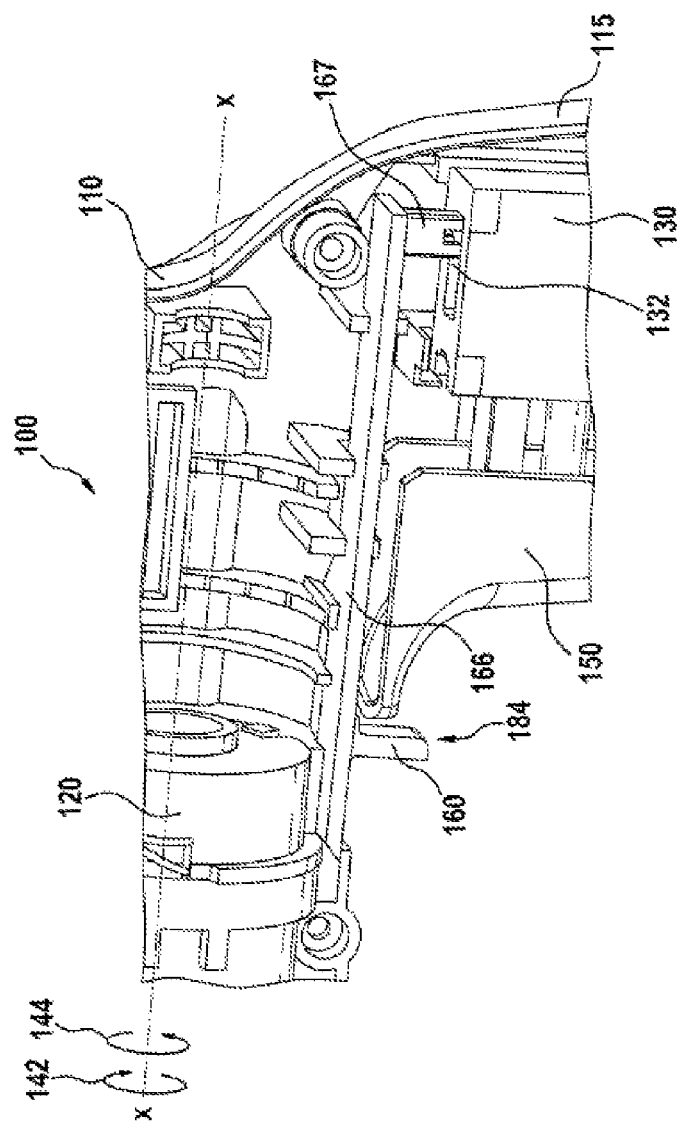
FIG. 3 shows a schematic, enlarged sectional side view of the embodiment from FIG. 1 of the second switching element having a direct engagement.

An alternative variant is represented in FIG. 3. Unlike the first variant described in FIG. 2, the switching web 166 is directly connected to the direction of rotation switch 132 by means of the connecting element 167, such that the connecting element 167 can be moved substantially parallelwise in relation to the rotation axis x. This switch arrangement has neither a switch rocker nor a gate shift.

Figure 4:
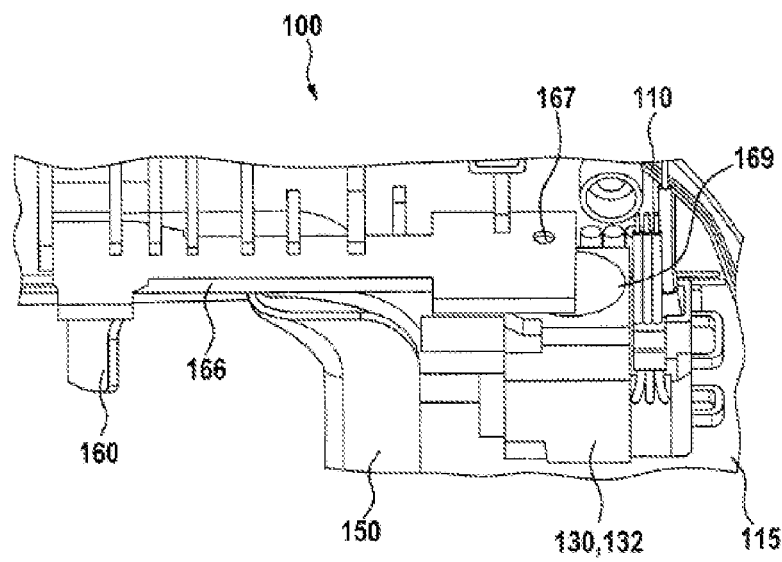
FIG. 4 shows a schematic, enlarged sectional side view of the embodiment from FIG. 1 of the second switching element having a rotary disk.
Figure 5:
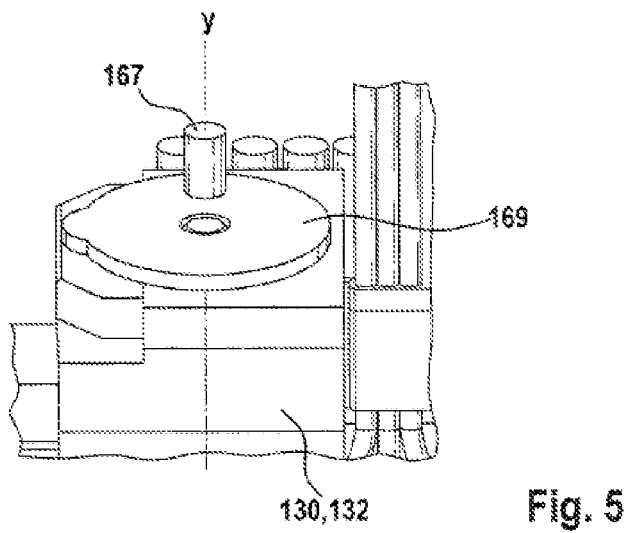
FIG. 5 shows a schematic, enlarged detail view of the first switch unit having a rotary disk.

In a further embodiment, represented in FIGS. 4 and 5, the switching web 166 is in engagement with the direction of rotation switch 132 by means of the connecting element 166 and by means of a rotary disk 169. The switching web 166 can thus be moved, to the greatest extent possible, substantially parallelwise in relation to the rotation axis x. The connecting element 167 is rotatably connected to the switching web 166, such that a movement executed along the rotation axis x is transmitted to the first switching unit 130 by means of a rotary movement of the rotary disk 169 and by means of the direction of rotation switch 132.

Figure 6:
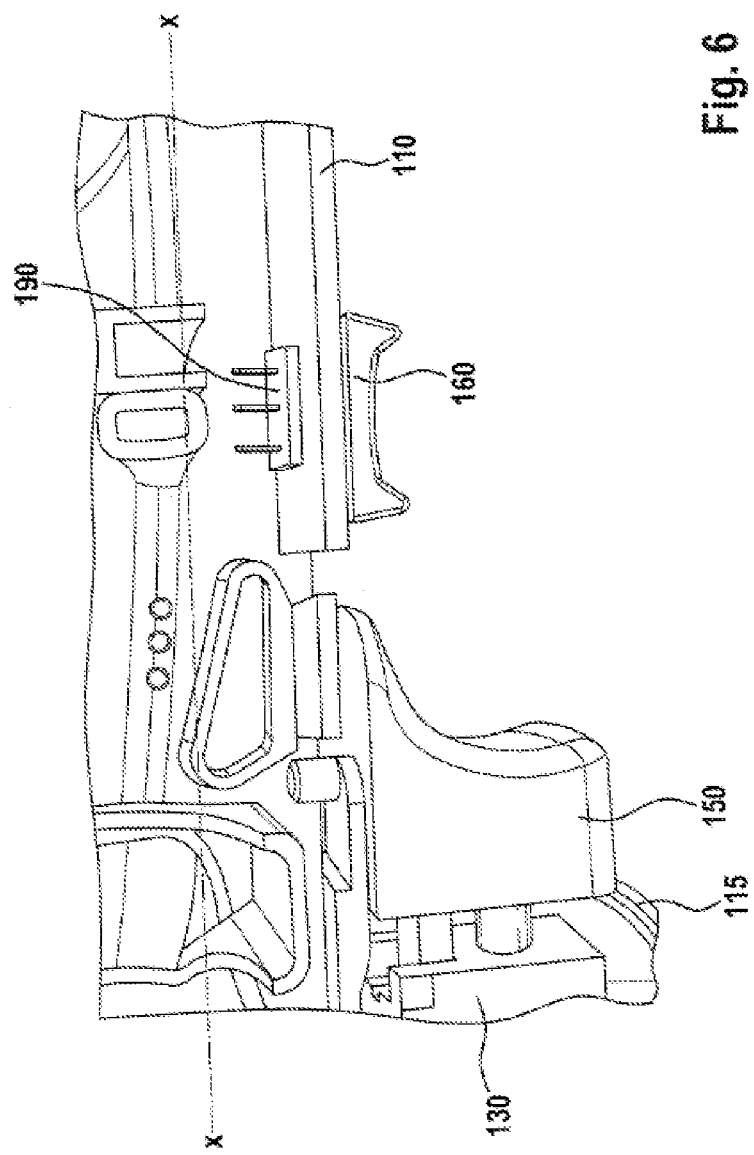
FIG. 6 shows a schematic, enlarged sectional side view of a hand-held power tool according to the disclosure having a second embodiment of the second switching element.
Figure 7:
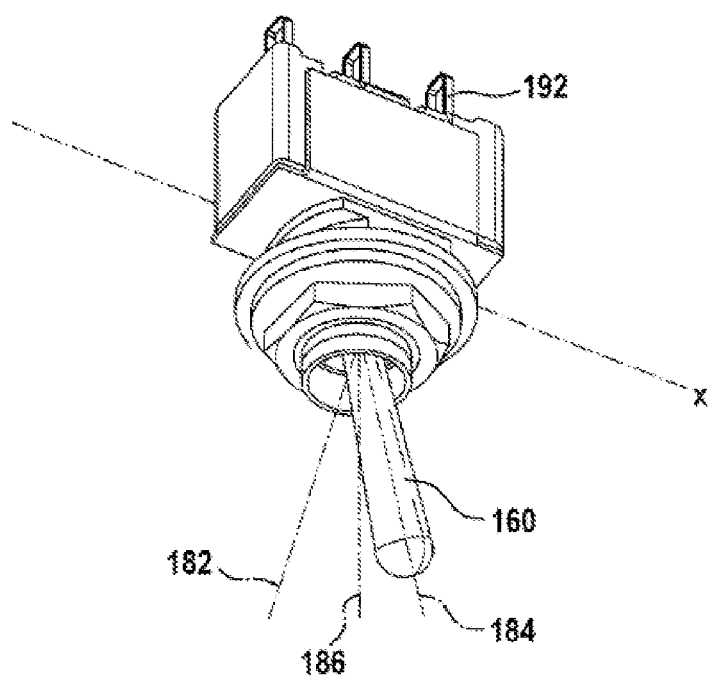
FIG. 7 shows a schematic, enlarged detail view of a third embodiment of a second switching element.

As represented in FIGS. 6 and 7, the second switching element 160 may alternatively also operate a second switch unit 190 that electronically transmits the position 182, 184, 186 of the second switching element 160 to the first switch unit 130, via contact elements 192. The second switching element 160 in this case may be realized as a slide switch or, as represented in FIG. 7, as a toggle switch.

Figure 8:
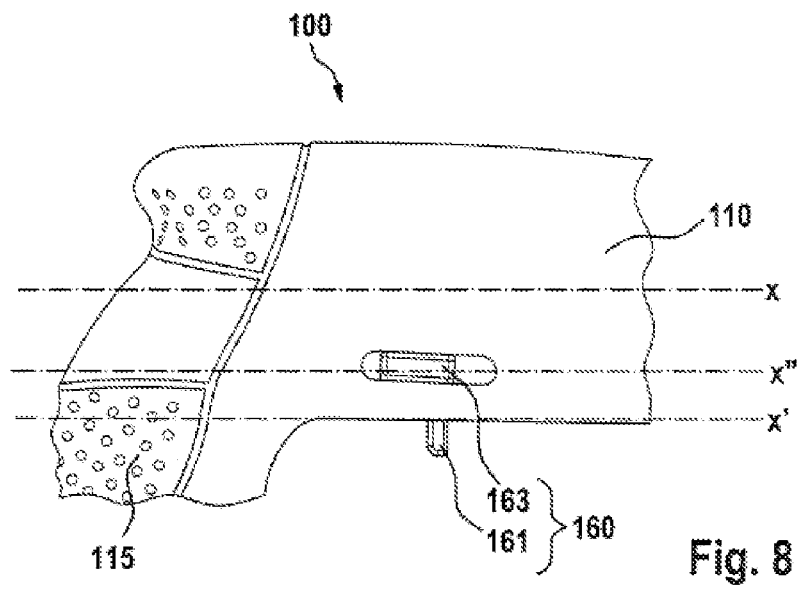
FIG. 8 shows a schematic side view of a hand-held power tool according to the disclosure having a fourth embodiment of the second switching element.
Figure 9:
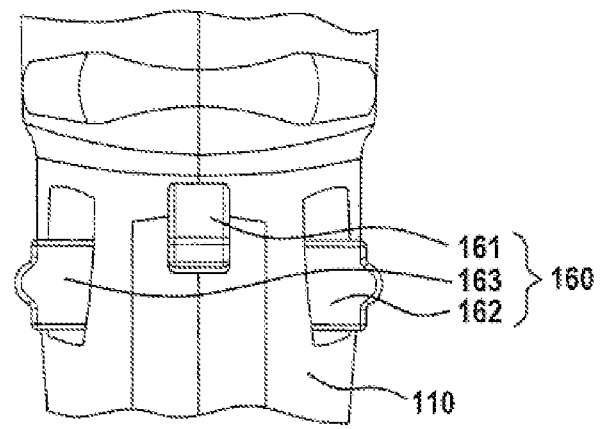
FIG. 9 shows a schematic, enlarged detail view of the fourth embodiment of the second switching element.

A fourth embodiment of the second switching element 160 is represented in FIGS. 8 and 9. In this case, the second switching element 160 is arranged in front of the first switching element 150 in the direction of the tool receiver 140, along the rotation axis x, in a region beneath the rotation axis x, and projects out of the housing 110 on the underside. In this case, the first switching element 150 and the second switching element 160 are arranged in succession along a common axis x', which is substantially parallel to the rotation axis x and which runs beneath the housing 110. Along the notional axis x', the second switching element 160 is arranged, in the form of a slide switch, in front of the first switching element 150 in the direction of the tool receiver 140, so as to be displaceable substantially transversely in relation to the longitudinal extent of the handle 115 and transversely in relation to the axis x. In this embodiment, a first portion 161 of the second switching element 160 projects downward out of the housing 110, and in addition the second switching element 160 has a second portion 162 and a third portion 163, which project out of the housing 110 on both sides. The user of the hand-held power tool 100 can thus operate the second switching element 160 both by means of the second portion 162 projecting laterally out of the housing 110 and the third portion 163 projecting laterally out of the housing 110, and by means of the first portion 161 of the second switching element 160 that projects out below the housing 110. The second switching element 160 can thus be easily and conveniently operated with the thumb, the index finger or another finger, such that it is immaterial whether the operator is right-handed or left-handed.

Figure 10:
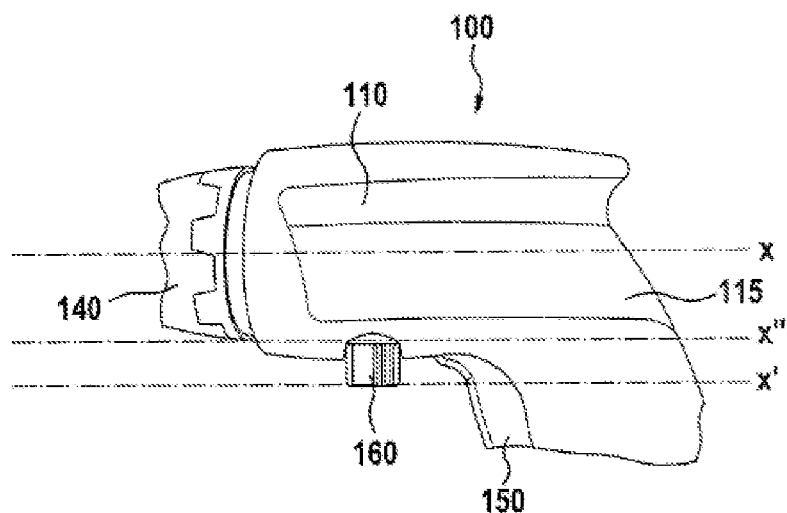
FIG. 10 shows a schematic side view of a hand-held power tool according to the disclosure having a fifth embodiment of the second switching element.
Figure 11:
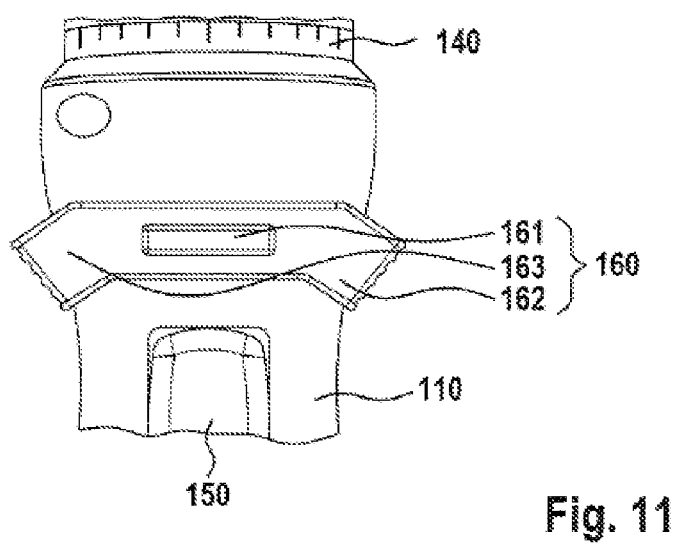
FIG. 11 shows a schematic, enlarged detail view of the fifth embodiment of the second switching element.

In principle, the second switching element 160 may be realized as a single piece. Alternatively, however, a multipart design is also conceivable, as represented in FIGS. 10 and 11, wherein, in the fifth embodiment of the second switching element 160, which is represented in FIGS. 10 and 11, the portions 163, 162 are formed as a single piece and can be fitted on to the first portion 161. Unlike the embodiment represented in FIGS. 8 and 9, the portions 162, 163 of the second switching element 160 extend beneath the housing 110, and do not project through the housing 110. The second switching element 160 in this case is of a shape that follows a contour of the housing 110 in such a manner that the second switching element can be operated on both sides. Owing to the multipart embodiment, the second switching element 160 can be reconfigured in a variable manner, such that it is possible for the operator to decide independently whether the lateral portions 162, 163 are to be mounted. In any case, in principle, both a single-piece design and a multi-piece design of the second switching element 160 are possible.

Figure 12:
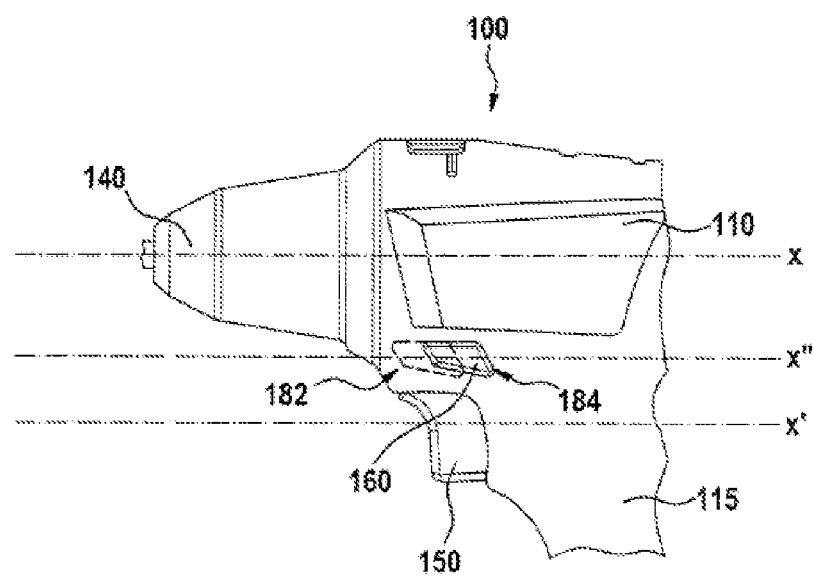
FIG. 12 shows a schematic side view of a hand-held power tool according to the disclosure having a sixth embodiment of the second switching element.

In the case of the sixth embodiment of the second switching element 160, represented in FIG. 12, the second switching element 160 is arranged above the first switching element 150. In this case, the second switching element 160 is arranged so as to be displaceable along an axis x" that is substantially parallel to the rotation axis x, such that the second switching element 160, upon actuation, executes a linear movement, substantially parallelwise in relation to the rotation axis x and, in the embodiment represented, can be moved back and forth between a first position 182, a second position and a third position 184. The axis x" runs beneath the rotation axis x, in the lower region of the housing 110, and above the notional axis x'. The rotation axis x and the notional axis x" in this case are parallel but offset in relation to each other. In this embodiment, the second switching element 160 is arranged such that it is fully integrated in the lower region of the housing 110, and projects laterally out of the housing 110.

What is essential is that, in the case of all variants, the second switching element 160, upon actuation, executes a linear movement, substantially parallelwise in relation to the rotation axis x. It is additionally essential that, in the case of all variants, the second switching element 160 is arranged in front of the first switching element 150 along the rotation axis x, such that it is possible to actuate the second switching element 160 with the index finger or middle finger, depending on the grip position. The second switching element 160 is arranged in front of the first switching element 150 in the direction of the tool receiver 140, long the rotation axis x. The distance between the first switching element 150 and the second switching element 160 in this case is selected such that it is possible to operate the hand-held power tool 100 with one hand. In particular, the arrangement of the second switching element 160 relative to the first switching element 150 allows both switching elements 150, 160 to be operated with one hand. The second switching element 160 is additionally arranged in a region beneath the rotation axis x. In the embodiment represented, for example according to FIGS. 1, 6 and 8 to 11, the second switching element 160 is arranged on the underside of the housing 110. In this case, the first switching element 150 and the second switching element 160 are arranged in succession along the common axis x', which is substantially parallel to the rotation axis x and which runs beneath the housing 110. Along the notional axis x', the second switching element 160 is arranged in front of the first switching element 150 in the direction of the tool receiver 140. In this embodiment, the first switching element 160 projects downward out of the housing 110.

In an alternative embodiment, not represented, the second switching element 160 is arranged in front of the first switching element 150 in the direction of the tool receiver 140, and above the first switching element 150. In this case, the second switching element 160 is arranged along the axis x", which is substantially parallel to the rotation axis x and which runs beneath the rotation axis x, in the lower region of the housing 110, and above the notional axis x'. The notional axes x' and x" in this case are parallel but offset in relation to each other. In this embodiment, the second switching element 160 projects laterally out of the housing 110, in the lower region of the housing 110.

In a further alternative embodiment, not represented, the second switching element 160 is divided into at least two actuating elements, the actuating elements advantageously being mounted, substantially parallel to and opposite each other along the rotation axis x, on the outside of the housing 110, such that the second switching element 160 can be operated both with the index finger or middle finger of the right and the left hand. In this case the two actuating elements are realized, in particular, such that they are continuous.

The disclosure is not limited to the exemplary embodiment that is described and represented. Rather, it also includes all further developments, by persons skilled in the art, within the scope of the disclosure. The disclosure, in particular the described switch arrangement, may thus have a multiplicity of applications, not only in the case of cordless electric tools, but also in the case of other electric appliances that are provided with an energy storage device, in particular one designed to be changed, such as electric domestic appliances, electric garden appliances, power tools, or the like.

Also conceivable, apart from the embodiments described and represented, are further embodiments that may comprise further modifications and combinations of features.

What is claimed is:

1. A hand-held power tool, comprising:
   a housing comprising a housing body and a handle, the handle arranged on the housing body extending away from an underside of the housing body;
   a drive motor arranged in the housing and configured to generate a torque;
   a tool receiver configured to rotate about a rotation axis;
   a transmission arranged in the housing and configured to transmit the torque from the drive motor to the tool receiver; and
   a first switch unit configured to control the drive motor and including:
      a first switching element configured to switch on and off a voltage supply to the drive motor; and
      a second switching element configured to control a direction of the rotation of the drive motor, the second switching element arranged so as to be displaceable along the rotation axis and configured to execute, upon actuation, a linear movement that is substantially parallel with the rotation axis, wherein the second switching element is arranged in front of the first switching element in a direction along the rotation axis towards the tool receiver and in a region below the rotation axis, and wherein the second switching element is arranged on the underside of the housing body.

2. The hand-held power tool according to claim 1, wherein the second switching element is configured to engage in at least two positions including:
   a first position in which the drive motor and the tool receiver rotate in a first direction; and
   a second position in which the drive motor and the tool receiver rotate in a second direction.

3. The hand-held power tool according to claim 2, wherein:
   the second switching element is closer to the tool receiver in the direction along the rotation axis when located in the first position than when located in the second position;
   the first direction corresponds to a clockwise rotation of the tool receiver; and
   the second direction corresponds to a counterclockwise rotation of the tool receiver.

4. The hand-held power tool according to claim 2, wherein the second switching element is configured to engage in a third position in which a motor current is interrupted by at least one of an electrical, electromechanical, and mechanical interruption.

5. The hand-held power tool according to claim 1, the first switch unit further including a direction rotation switch, wherein the second switching element is configured to mechanically actuate the direction rotation switch.

6. The hand-held power tool according to claim 5, wherein:
   the second switching element is mounted on an outside of the housing, and is connected to a switching web arranged inside the housing;
   the switching web is engaged with the direction rotation switch; and
   the switching web is configured and arranged so as to be movable substantially parallelwise in relation to the rotation axis.

7. The hand-held power tool according to claim 6, further comprising a connecting element movable substantially parallelwise in relation to the rotation axis and which effects the engagement between the switching web and the direction rotation switch.

8. A hand-held power tool, comprising:
   a housing that includes a handle;
   a drive motor arranged in the housing and configured to generate a torque;
   a tool receiver configured to rotate about a rotation axis;
   a transmission arranged in the housing and configured to transmit the torque from the drive motor to the tool receiver; and
   a first switch unit configured to control the drive motor and including:
      a first switching element; and
      a second switching element, the second switching element being configured to control a direction of the rotation of the drive motor, and the second switching element being further configured to execute, upon actuation, a linear movement that is substantially parallel with the rotation axis,
   wherein the first switch unit further includes a direction rotation switch,
   wherein the second switching element is configured to actuate the direction rotation switch,
   wherein the second switching element is mounted on an outside of the housing, and is connected to a switching web arranged inside the housing,
   wherein the switching web is engaged with the direction rotation switch,
   wherein the switching web is configured and arranged so as to be movable substantially parallelwise in relation to the rotation axis, and
   wherein the hand-held power tool further comprises a rotary disk configured and arranged so as to be rotatable about the rotation axis and so as to effect the engagement between the switching web and the direction rotation switch.

9. The hand-held power tool according to claim 6, further comprising a switch rocker movable substantially transversely in relation to the rotation axis and that effects the engagement between the switching web and the direction rotation switch.

10. A hand-held power tool, comprising:
   a housing that includes a handle;
   a drive motor arranged in the housing and configured to generate a torque;
   a tool receiver configured to rotate about a rotation axis;
   a transmission arranged in the housing and configured to transmit the torque from the drive motor to the tool receiver; and
   a first switch unit configured to control the drive motor and including:
      a first switching element; and
      a second switching element, the second switching element being configured to control a direction of the rotation of the drive motor, and the second switching element being further configured to execute, upon actuation, a linear movement that is substantially parallel with the rotation axis,
   wherein the first switch unit further includes a direction rotation switch,
   wherein the second switching element is configured to actuate the direction rotation switch,
   wherein the second switching element is mounted on an outside of the housing, and is connected to a switching web arranged inside the housing,
   wherein the switching web is engaged with the direction rotation switch,
   wherein the switching web is configured and arranged so as to be movable substantially parallelwise in relation to the rotation axis,
   wherein the hand-held power tool further comprises a switch rocker configured and arranged so as to be movable substantially transversely in relation to the rotation axis and so as to effect the engagement between the switching web and the direction rotation switch, and
   wherein the hand-held power tool further comprises gate shift configured to convert a longitudinal movement of the switching web into a transverse movement of the switch rocker.

11. The hand-held power tool according to claim 1, further comprising:
   a sensor configured to sense a position of the second switching element at least one of inductively, capacitively, magnetically, and optically; and
   a second switching unit, wherein:

the second switching element is configured to operate the second switching unit; and the second switching unit is configured to electronically transmit a position signal indicative of the position of the second switching element to the first switch unit.

12. The hand-held power tool according to claim 1, further comprising a switching web arranged inside the housing, wherein:

the second switching element further includes a plurality of portions arranged on an outside of the housing and connected to the switching web; and each of the plurality of portions projects in a different direction out from the housing.

13. The hand-held power tool according to claim 1, the second switching element including at least two portions that are mounted on an outside of the housing so as to move parallel to one another and which are located on opposite sides of a vertical plane extending centrally through the housing, the handle, and the rotation axis.

14. The hand-held power tool according to claim 1, wherein the second switching element has a shape that follows a contour of the housing so as to enable operation of the second switching element on opposite sides of the housing.

15. The hand-held power tool according to claim 1, wherein the second switching element extends, at least in portions, inside the housing.

16. The hand-held power tool according to claim 1, further comprising a drive shaft, wherein:

the transmission is further configured to transmit the torque from the drive motor to a drive shaft; and the hand-held power tool is at least one of a baton screwdriver, a percussion power drill, a multifunction tool, a drill, a driver, a cordless drill, a cordless screwdriver, a cordless drill, and a cordless driver.

17. The hand-held power tool according to claim 1, wherein the second switching element projects downwardly out of the housing body.

18. The hand-held power tool according to claim 1, wherein the second switching element is arranged entirely in front of the first switching element in the direction along the rotation axis towards the tool receiver.

19. A hand-held power tool, comprising:

a housing comprising a housing body and a handle, the handle arranged on the housing body extending away from an underside of the housing body;

a drive motor arranged in the housing and configured to generate a torque;

a tool receiver configured to rotate about a rotation axis;

a transmission arranged in the housing and configured to transmit the torque from the drive motor to the tool receiver; and a first switch unit configured to control the drive motor and including:

a first switching element configured to switch on and off a voltage supply to the drive motor; and a second switching element configured to control a direction of the rotation of the drive motor, the second switching element arranged so as to be displaceable along the rotation axis and configured to execute, upon actuation, a linear movement that is substantially parallel with the rotation axis, wherein the second switching element is arranged in front of the first switching element in a direction along the rotation axis towards the tool receiver and in a region below the rotation axis, wherein the second switching element is arranged on the underside of the housing body, wherein the second switching element is configured to engage in at least two positions including:

a first position in which the drive motor and the tool receiver rotate in a first direction; and a second position in which the drive motor and the tool receiver rotate in a second direction, and wherein the second switching element is configured to engage in a third position in which a motor current is interrupted by at least one of an electrical, electromechanical, and mechanical interruption.

\* \* \* \* \*